United States Patent [19]

Winkler et al.

[11] 3,819,418

[45] June 25, 1974

[54] THERMOELECTRIC GENERATOR AND METHOD OF PRODUCING THE SAME

[75] Inventors: Josef Winkler; Gerhard Oesterhelt, both of Nurnberg, Germany

[73] Assignee: Siemens Aktiengesellschaft, Berlin & Munich, Germany

[22] Filed: July 13, 1972

[21] Appl. No.: 271,241

Related U.S. Application Data

[62] Division of Ser. No. 839,910, July 8, 1969, abandoned.

[52] U.S. Cl. .................................. 136/205, 136/238

[51] Int. Cl. .................................. H01v 1/32

[58] Field of Search .................................. 136/203–205, 136/211, 212, 238

[56] References Cited

UNITED STATES PATENTS

| | | | |
|---|---|---|---|
| 3,110,628 | 11/1963 | Ramey, Jr. et al. | 136/204 |
| 3,301,714 | 1/1967 | Lyman, Jr. | 136/212 |
| 3,377,206 | 4/1968 | Hanlein et al. | 136/212 |
| 3,449,172 | 6/1969 | Dingwall | 136/205 |
| 3,496,026 | 2/1970 | Mayo | 136/205 |
| 3,607,444 | 9/1971 | DeBues | 136/212 |
| 3,615,871 | 10/1971 | Merges et al. | 136/212 |

FOREIGN PATENTS OR APPLICATIONS

| | | | |
|---|---|---|---|
| 1,106,608 | 3/1968 | Great Britain | 136/205 |

*Primary Examiner*—Harvey E. Behrend

*Attorney, Agent, or Firm*—Herbert L. Lerner

[57] ABSTRACT

Thermoelectric generator including a thermocouple with a p-type leg and an n-type leg having respective adjacent cold ends and hot ends, contact bridges attached to the legs at both ends thereof and connecting the legs to one another at one end thereof, heat exchangers respectively connected to the contact bridges at the cold and hot ends of the legs, each of the legs having two segments formed of different thermoelectrically effective materials, and electrically and thermally conductive connecting means connected to the segments of each of the legs and having at least two components one of which is flexible, the components being metallurgically bonded respectively to each of the segments and connected to one another; and method of producing the same.

3 Claims, 7 Drawing Figures

THERMOELECTRIC GENERATOR AND METHOD OF PRODUCING THE SAME

Figure 1:
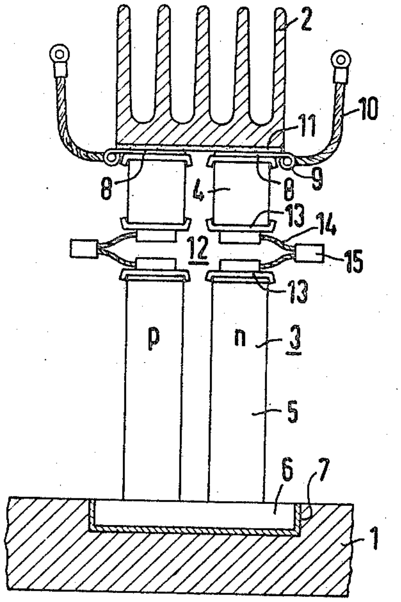

This is a division, of application Ser. No. 839,910, filed July 8, 1969, now abandoned.

Our invention relates to thermoelectric generator with p and n-conductive segmented thermocouple legs, wherein the segments of each leg are made up of different thermoelectrically effective materials; the legs are in electrically conductive contact with contact bridges and are disposed between hot and cold heat exchangers that are rigidly attached thereto through the contact bridges; and method of producing the thermoelectric generator.

In thermoelectric generators many thermocouple elements are generally combined so that the respective hot and cold soldering locations thereof are disposed in one plane, namely the hot or cold side of the thermoelectric generator. Each thermocouple element is formed of a pair of thermocouple legs, of which each leg is made up of either p or n-conductive thermoelectrically effective material. The thermocouple legs are electrically connected at the hot and cold side thereof by contact bridges of electrically and thermally conductive material in such a manner that all of the thermocouple legs are electrically in series and thermally in parallel. Generally, a heat exchanger is placed on the hot as well as the cold side of the thermocouple element and is separated from the contact bridges by a layer of thermally conductive and electrically insulating material.

The thermally conductive contact between the thermocouple legs and the heat exchangers must be especially good, because the efficiency of the thermoelectric generator is believed to be dependent thereon. A temperature gradient exists between the hot and cold side of the thermoelectric generator, the gradient increasing greatly in the direction of the axis of the legs and, moreover, varying locally. Thermal expansions result therefrom in the direction of the axis of the legs, these expansions varying locally and being often very large. Due to the forces produced by this expansion, the local attachment of the thermocouple legs to the heat exchangers must be very stable mechanically. Moreover, when installing the thermocouple legs between the heat exchangers, attention must be given to the fact that manufacturing tolerances in the longitudinal direction of the legs cannot be avoided.

To compensate for the thermal expansion and the manufacturing tolerances and for a stable, locally fixed installation of the thermocouple legs it is already known to apply an elastic force to the thermocouple legs in the axial direction thereof with springs and if necessary through a pressure member. The heat exchangers accordingly serve as thrust bearings. A disadvantage of this known practice is that the heat conduction between the thermocouple legs and the heat exchangers is impaired due to the pressure contact. Moreover, the danger arises that the pressure contact fails and thermocouple legs are damaged due to the thermal expansion forces. In view of this principle, the operation of the heretofore known thermoelectric generators is not reliable.

Since there is a temperature gradient along the thermocouple legs, it is advantageous to construct the thermocouple legs of segments of different thermoelectrically effective materials. The material is to be selected and the dimensions of the segments are to be determined in such manner that each segment is located within a temperature range affording maximum thermoelectric effectivity. A marked improvement in efficiency is thereby obtained. In addition to the aforementioned thermal expansion forces applied in the direction of the longitudinal axis of the legs, thermal expansion forces are produced perpendicularly to the longitudinal axis of the legs in the contact locations of the segments of the thermocouple legs because different materials are connected at those locations. In constructing a thermoelectric generator with segmented thermocouple legs, compensation of these expansion forces must be taken into account. Moreover, the contacting of the segments must afford relatively good electrical and thermal conduction. It is known to solder the segments on opposite surfaces of a tungsten disc. To compensate for the thermal expansion forces, several solder layers with different thermal coefficients of expansion are accordingly provided between the tungsten disc and the segments and thereby provide a transition between the thermal coefficients of expansion of the segment materials and the coefficient of expansion of the tungsten disc. The contacting is very difficult to produce from a technological standpoint and requires several operational steps. Contacting is further impeded by the different melting points of the semiconductor materials that are employed, which are necessary due to the different soldering temperatures at both sides of the tungsten disc.

It is accordingly an object of our invention to provide thermoelectric generator which avoids the foregoing disadvantages of the heretofore known devices of this general type.

More particularly, it is an object of our invention to provide such thermoelectric generator with simplified means for compensating for the thermal expansion forces that are produced along the longitudinal axis of the thermocouple legs and perpendicular thereto in the contact locations of the segments, and to provide a simplified method of producing such a thermoelectric generator.

With the foregoing and other objects in view, we accordingly provide thermoelectric generator comprising contact bridges at the hot and cold ends of the thermocouple legs that are mechanically secured to heat exchangers at those ends, electrically and thermally conductive connecting means connected to the segments of each thermocouple leg, the connecting means having at least two parts one of which is flexible, the parts being metallurgically bonded respectively to each of the segments and connected to one another.

In accordance with another feature of the invention, the material of the connecting means has a better electrical and thermal conductivity than the thermoelectrically effective materials of the thermocouple legs.

In accordance with a further feature of the invention, the parts of the connecting means are connected through metal plates with the segments of the thermocouple legs.

In accordance with added features of the invention, the parts of the connecting means for each of the thermocouple legs are mechanically connected to one another. In accordance with one embodiment of our invention, the flexible part of the connecting means is a silver braided wire or pigtail, and the parts are connected to one another by a crimping sleeve or other clamping device or can be screwed together. In accordance with another festure of the invention, the flexible part is a silver plate and both parts of each connecting means can be flanged or beaded together.

In accordance with the method of our invention, we metallurgically connect the segments of each of the thermocouple legs respectively with the parts of the connecting means for that leg, then mechanically connect both parts of the connecting means to one another, and thereafter secure the contact bridges at the respective ends of the legs to the respective heat exchangers.

Other features which are considered as characteristic for the invention are set forth in the appended claims.

Although the invention is illustrated and described herein as thermoelectric generator and method of producing the same, it is nevertheless not intended to be limited to the details shown, since various modifications may be made therein without departing from the spirit of the invention and within the scope and range of equivalents of the claims.

Figure 4:
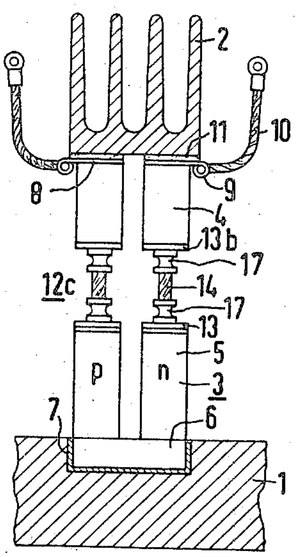
Figure 5:
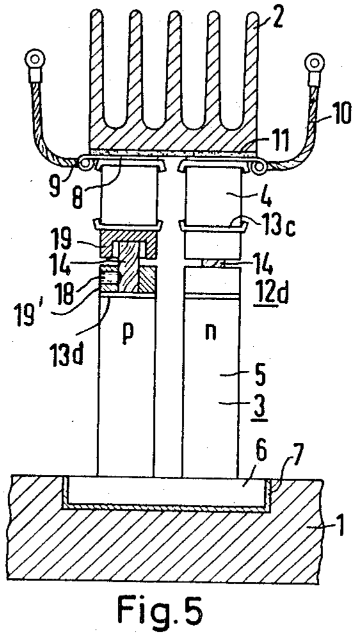
Figure 6:
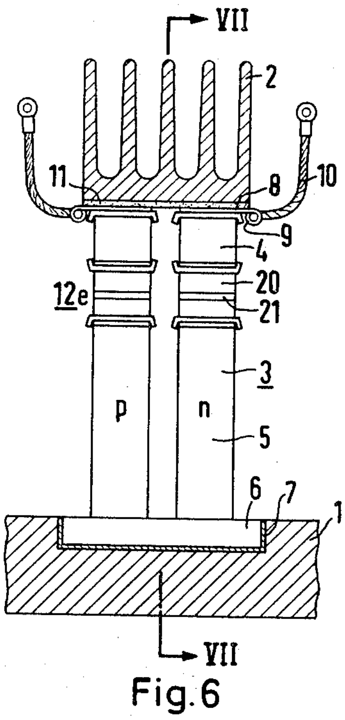
Figure 7:
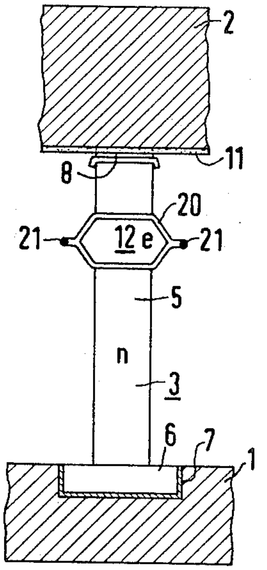

The invention, however, together with additional objects and advantages thereof will be best understood from the following description when read in connection with the accompanying drawings, in which:

FIGS. 1 to 6 are elevational views partly in section of various embodiments of the thermoelectric generator of our invention which differ primarily in the type of connecting members employed therein; and FIG. 7 is a sectional view of FIG. 6 taken along the line VII—VII therein.

Analogous components of the different embodiments are identified by the same reference numerals in the figures.

Referring now to the drawings and first particularly to FIG. 1 thereof, there is shown a side elevational view of one embodiment of the thermoelectric generator according to our invention, wherein a hot heat exchanger 1 and a cold heat exchanger 2 are illustrated in cross section. Each of the respective p and n-conductive thermocouple element legs 3 of the generator is made up of two segments 4 and 5. If the thermoelectric generator is designed for a hot-side temperature of about 1,000°C, then the segments 5, which are directly exposed to the hot-side temperature, are formed of GeSi alloy. GeSi alloys have a maximum thermoelectric effectivity at about 750° – 1,050°C. The segment 4 of the cold side of the thermoelectric generator is made of PbTe or $Bi_2Te_3/Sb_2Te_3$, for example. The former material has a maximum thermoelectric effectivity at about 300° to 600°C and the latter at about 50° to 350°C.

The segments 5 of the hot side are connected by a contact bridge 6 of material having relatively good electrical and thermal conductivity. Metal-silicon alloys such as molybdenumsilicon alloys are especially suitable as materials for the contact bridge 6. The contact bridge 6 is seated in a recess formed in the heat exchanger 1 and is firmly secured therein by a hardenable ceramic material 7. Hardenable ceramic materials such as are known and obtainable in the trade under the marks Thermostix 2000 or Thermostix 3000, for example, may be used therefor. These materials are electrically and thermally insulating. Instead of securing the contact bridge 6 with a hardenable ceramic mass, a shaped ceramic part or adapter can be provided, by means of which the contact bridge 6 is retained, or the contact bridge 6 can be threadedly connected by screws, for example, with the hot heat exchanger 1. It is also possible to slidingly secure the contact bridge 6 in an opening in the hot heat exchanger 1. The opening is lined with a ceramic sleeve in which the contact bridge is accommodated. In this case, the hot contact bridge 6 is directly subjected to the effect of the heat source. This aforedescribed possible means for securing the hot side of the thermocouple are not shown in the figures, but are believed to fall well in the scope of our invention.

At the cold side of the thermoelectric generator, a silver plate 8 provided with a connecting fin 9 is disposed respectively on the segments 4 as contact bridges. The edge of the silver plate 8 can be bent in the direction of the respective thermocouple leg 3 so as to prevent thereby the material from coming into contact with possible doped solder layers. Silver braided wires or pigtails 10 are secured to the connecting fins 9 and provide an electrical connection to adjacent non-illustrated thermocouple legs 3 or means for tapping off the electric current produced by the thermoelectric generator. A ceramic plate 11 metallized on both sides thereof is disposed between the silver plates 8 and the cold heat exchanger 2, which is provided with heat exchanger fins, and is soldered thereto. The material of which the ceramic plate 11 is formed is either aluminum oxide or beryllium oxide, both of which are electrically insulating and thermally conducting. In addition to the illustrated cold-side connection of the segments 4, an adhesive connection or a screw connection with the cold heat exchanger is also possible. This latter possible means for securing the segments 4 to the heat exchanger 2 are not shown in the drawings.

The segments 4 and 5 of each of the thermocouple legs 3 are electrically and thermally conductively connected to one another by a connecting means 12. A silver plate 13 is soldered or welded onto the opposing end faces of each segment 4 and 5. A silver pigtail 14 forming a flexible part of the connecting means 12 is fastened by soldering or welding or the like to each silver plate 13. Both of the silver pigtails 14 of each connecting means 12 are clamped together by means of a crimping sleeve 15.

Since the segments 4 and 5 of each thermocouple leg 3 are rigidly secured to a heat exchanger, they can then freely expand in the space between the segments 4 and 5, and no danger of rupture or breakdown due to thermal expansion in the longitudinal direction of the legs 3 exists. The thermal expansion perpendicular to the longitudinal direction of the legs 3 is absorbed for each segment 4 and 5 by the elasticity of the silver plate 13 so that the contact between the segments 4 and 5 is free from disruption. The cross section of the pigtails 14 can be suitably selected so that the electrical and thermal resistance of the connecting means 12 in the electrical and thermal flow path is virtually insignificant and the efficiency of the thermoelectric generator is not affected by the segment contacts.

Attention is especially directed to the mechanically produced connection of the silver pigtails 14 in the connecting means 12. The possibility is presented therein of soldering the silver plate 13 separately to the segments 4 and 5 and then first producing the contact between the segments. If necessary, the crimp connection 15 can also be produced only after the segments 4 and 5 have been attached to the heat exchangers 1 and 2.

Figure 2:
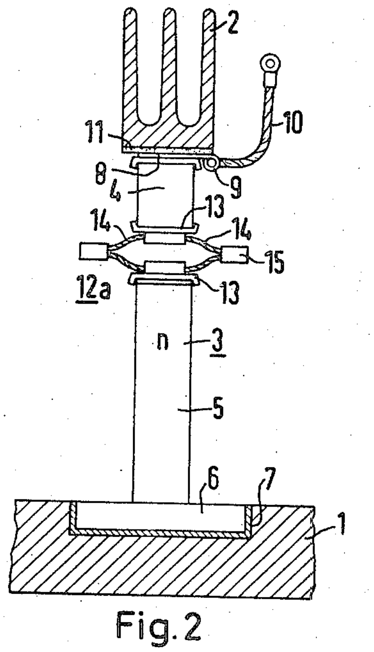

In FIG. 2 there is shown a side view of a thermocouple leg 3. The connecting means 12*a* of FIG. 2 differ, however, from the connecting means of FIG. 1 in that two silver pigtails 14 are secured to each silver plate 13 in the embodiment of FIG. 2. To provide electrical contact between the segments 4 and 5, the silver pigtails 14 are also mechanically connected by means of crimping sleeves 15 in the embodiment of FIG. 2. The embodiment of FIG. 2 is especially advantageous when silver pigtails of relatively small diameter are to be used.

Figure 3:
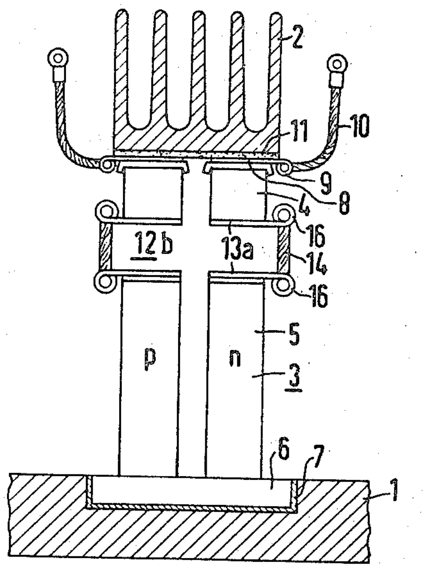

In the embodiment of FIG. 3, the silver plates 13*a* of the connecting means 12*b* are provided with connecting fins 16 wherein silver braided wires or pigtails 14 are soldered or crimped.

In the embodiment of FIG. 4, pinched bases 17 are placed on the silver plates 13*b* of the connecting means 12*c*. Silver pigtails 14 are mechanically secured by any suitable means in the pinched base 17 for connecting the segments 4 and 5.

In the embodiment of FIG. 5, a silver pigtail 14 is soldered to one of the silver plates 13*c* of a connecting means 12*d*. The silver pigtail 14 is also threaded by means of a screw 18 into contact with the second metal plate 13*d*. The threaded connection is represented in the cross-sectional view of the connecting means 12*d* for the p-conductive thermocouple leg on the left-hand side of FIG. 5. In addition, in the embodiment of FIG. 5, the metal plates 13*c* and 13*d* are provided with an annular flange 19 and 19' respectively for preventing the formation of too great a kink or bent in the segmented thermocouple legs 3.

FIG. 6 presents a view of a thermoelectric generator according to the invention wherein the connecting means 12*e* is formed of silver plate. Silver plate strips 20 are soldered on the faces of the segments 4 and 5 of each of the legs 3 of the thermocouple. The silver plate strips 20 outwardly project beyond the lateral boundary of the segments 4 and 5 and are bent away from the segments 4 and 5. The laterally projecting silver plate strips are connected to one another by two flanged or beaded seams 21. The shape of the silver plate strips and the position of the flanged or beaded seams 21 are apparent from the sectional view of FIG. 7.

The silver plate 20 may be elastic or resilient. Due to this elasticity or resiliency of the silver plate, no compressive forces need be applied, consequently, for compensating the thermal expansion forces.

Because of the fact that the contact bridges of the thermocouple legs in the thermoelectric generator of our invention are connected with the heat exchanger, a relatively good local fixing of the thermocouple legs is assured. The thermal expansion forces in the longitudinal direction of the legs are compensated by the flexible connecting means so that a relatively good heat conduction is assured and damage to the segments of each thermocouple leg cannot occur since the ends of the segments hang freely in space. Moreover, only the expansion force of one of the segments of each thermocouple leg is excited on a respective part of the connecting means in the contact location perpendicularly to the longitudinal axis of the thermocouple leg. This is compensated or balanced, however, by the elasticity of the part of the connecting means. No further special precautionary measures, primarily the provision of several solder layers, are necessary.

We claim:

1. Thermoelectric generator comprising at least one thermocouple having a p-type leg and an n-type leg with respective adjacent cold ends and hot ends, each of said thermocouple legs having two segments formed of different thermoelectrically effective materials, contact bridges attached to said thermocouple legs at said cold ends and hot ends thereof, heat exchangers respectively connected to said contact bridges at said cold ends and said hot ends of said thermocouple legs, electrically and thermally conductive plate means connected to the segments of each of said thermocouple legs and located between the two segments of each leg, said plate means comprising pairs of plates in which each plate of a pair has an intermediate flat plate portion extending generally transversely of the axis of said segments, means securing said intermediate portion of each plate of said pair of plates to the end of a respective segment, said intermediate portion of each plate of a pair of plates being spaced from one another, said plates having lateral portions extending beyond the outer boundary of the respective segment to which it is secured, said lateral portions of said plates being bent at an acute angle relative to its respective intermediate portion, the lateral bent portions of one of said pair of plates extending in a direction generally towards the other plate of said pair of plates, and means securing the outwardly extending lateral bent portions of one of said pair of plates to the lateral bent portions of the other of said pair of plates wherein said lateral bent portions of one of said pair of plates is in direct contact with the lateral bent portions of the other of said pair of plates, whereby said pair of plates provide for axial expansion of said segments.

2. Thermoelectric generator according to claim 1 wherein said plate means are made of silver.

3. Thermoelectric generator according to claim 1 wherein said securing means is defined by a seam joining the ends of said plates.

* * * * *